United States Patent [19]
Kim

[11] Patent Number: 5,892,639
[45] Date of Patent: Apr. 6, 1999

[54] DUAL HEAD AZIMUTH ALIGNMENT MECHANISM IN AN AUTOREVERSE CAR AUDIO DEVICE

[75] Inventor: Yu-In Kim, Incheon, Rep. of Korea

[73] Assignee: Daewoo Electronics Co., Ltd., Seoul, Rep. of Korea

[21] Appl. No.: 867,521

[22] Filed: Jun. 2, 1997

[30] Foreign Application Priority Data

Aug. 29, 1996 [KR] Rep. of Korea ...................... 96-36239

[51] Int. Cl.$^6$ .............................. G11B 5/56; G11B 21/24
[52] U.S. Cl. ........................................... 360/109; 360/106
[58] Field of Search ................................... 360/104, 105, 360/106, 109, 76

[56] References Cited

U.S. PATENT DOCUMENTS

| | | | |
|---|---|---|---|
| 4,809,108 | 2/1989 | Tanaka et al. | 360/109 |
| 5,291,362 | 3/1994 | Kato | 360/106 |
| 5,528,439 | 6/1996 | Tamura | 360/109 |

FOREIGN PATENT DOCUMENTS

| | | |
|---|---|---|
| 311584A | 10/1984 | Germany . |
| 1-151106 | 6/1989 | Japan . |
| 8-167196 | 6/1996 | Japan . |
| 2 196 778 | 5/1988 | United Kingdom . |

OTHER PUBLICATIONS

*Patent Abstracts of Japan*, vol. 17, No. 197 (P. 1523), Apr. 16, 1993 & JP 04 344317 A (Shinwa KK), Nov. 30, 1992.
*Patent Abstracts of Japan*, vol. 96, No. 10, Oct. 31, 1996 & JP 08 167196 A (Tokyo Pijiyon KK), May 6, 1996.
*Patent Abstracts of Japan*, vol. 13., No. 412 (P. 932), Sep. 12, 1989 & JP 01 151016 A (Matsushita Electric Industrial Co., Ltd.), Jun. 13, 1989.

*Primary Examiner*—George J. Letscher
*Attorney, Agent, or Firm*—Beveridge, DeGrandi, Weilacher & Young, LLP

[57] ABSTRACT

A dual azimuth alignment mechanism of an autoreverse car audio device adjusts a head angle in contact with a tape by switching the screw installing portions inserted and connected with azimuth alignment screws by a changeover portion geared with a head movement portion. The head movement portion has a contacting portion for adjusting a head azimuth by making contact with the alignment screws. An azimuth alignment portion is pivotally installed at the head movement portion, and the screw installing portions formed at one side of the azimuth alignment portion selectively make contact with a contact portion. A thin plate is installed between the alignment screws and the contact portion for preventing abrasion of the contact portion. The azimuth alignment portion is fixed with a head at the head movement portion and is elastically switched by an elastic portion of the mounting portion.

17 Claims, 7 Drawing Sheets

DUAL HEAD AZIMUTH ALIGNMENT MECHANISM IN AN AUTOREVERSE CAR AUDIO DEVICE

BACKGROUND OF THE INVENTION

1. Field of the Invention

The present invention relates to a dual head azimuth alignment mechanism in an autoreverse car audio device, more particularly to a dual head azimuth alignment mechanism in an autoreverse car audio device for adjusting an angle of a head making contact with a tape by switching over an azimuth alignment portion according to operating modes.

2. Description of the Prior Art

Audio devices recently developed are designed to accomplish various functions like autoreverse, a section repetition, and etc. Especially, the autoreverse function is to automatically switch a traveling direction of a tape from forward to reverse direction and from reverse to forward direction. Hence, the autoreverse type car audio device needs a tape running direction changeover mechanism for automatically switching the traveling direction of the tape. The autoreverse type car audio also requires an azimuth adjusting apparatus for matching a gap angle of a head (hereinafter, referred to as an azimuth) and an angle between channels on the tape. The reason is that, in the car audio permitting the changeover of the tape traveling direction in either one of the two directions, it is desirable that the head is brought into contact with the tape at an appropriate angle without any regard in which direction of the tape is caused to run. However, it is difficult to adjust the azimuth in the autoreverse type car audio which allows the traveling direction of the tape to change in either one of two directions. Also, when the azimuth fails to be adjusted, a gap between the channel and the head substantially increases. As a result, the cross talk between nearby channels arises from the misaligned position of the azimuth, and the high band of the recorded information is attenuated. To solve the above problems, various apparatus for aligning the azimuth are proposed to adjust a channel aligning angle and the gap angle of the head.

Figure 2:
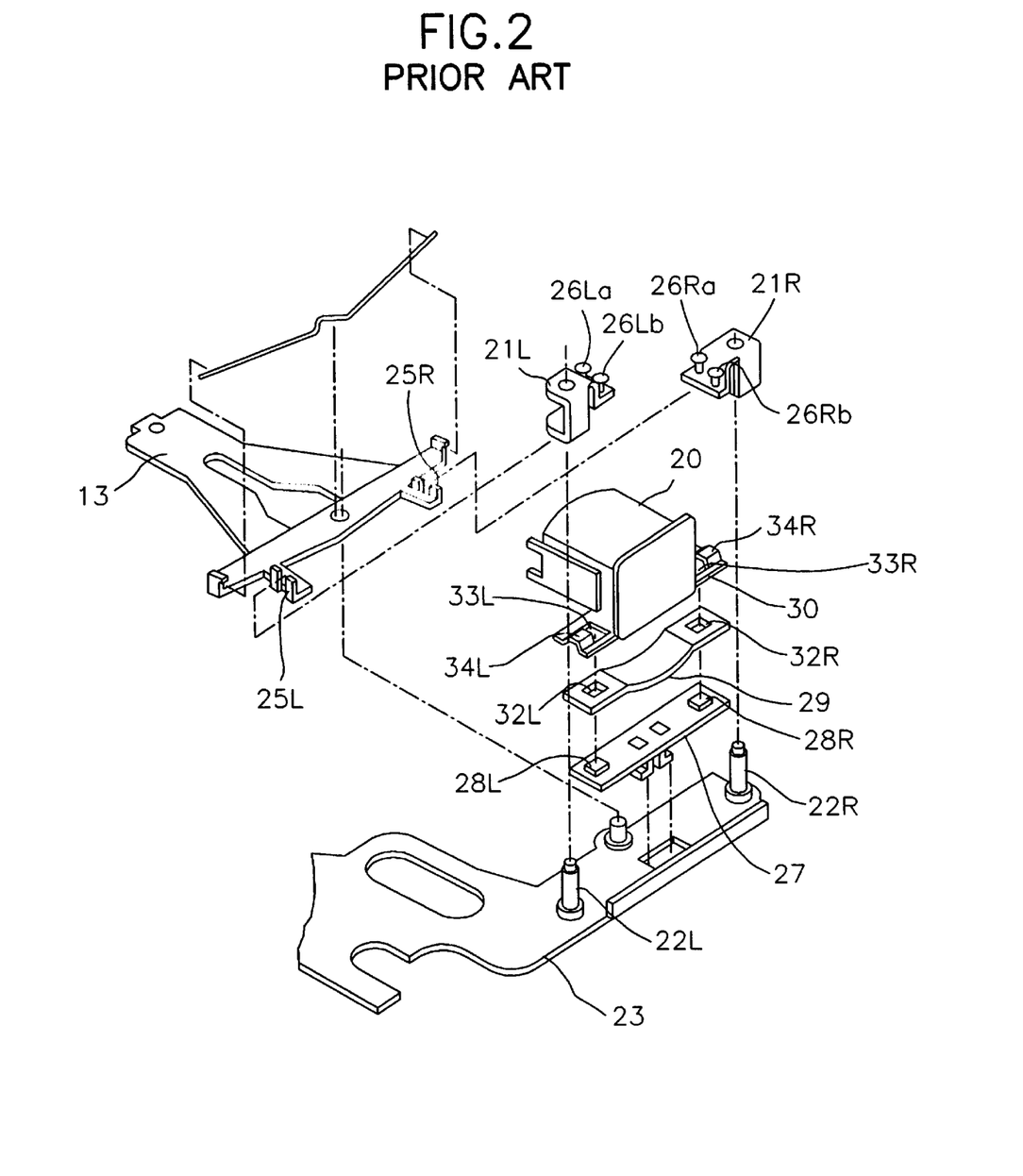
FIG. 2 is an exploded perspective view of the magnetic head and its peripheral parts in the conventional azimuth alignment mechanism.

One of the conventional apparatus for aligning the azimuth is described in U.S. Pat. No. 4,809,108. In the conventional azimuth alignment mechanism, on both sides of a magnetic head 20 azimuth alignment screw support members 21L, 21R are arranged. The support members 21L, 21R are rotatably provided about their corresponding pivots 22L, 22R. Both pivots 22L, 22R are provided upright on a plate-like member 23 which supports the magnetic head 20 thereon and is movable back and forth as shown in FIG. 2.

Figure 3:
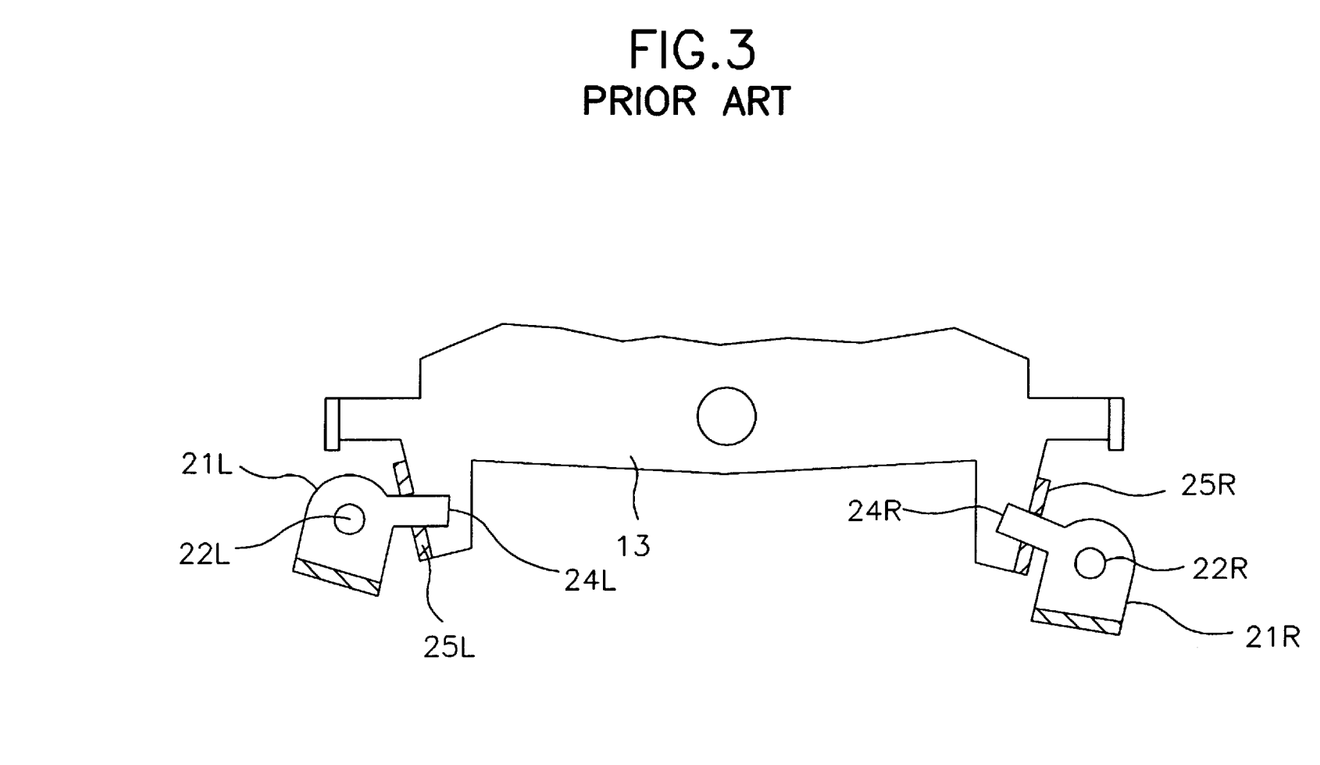
FIG. 3 is a plan view which shows the relationship between a pinch roller changeover portion and azimuth alignment screws supporting portion in the conventional azimuth alignment mechanism.

The left-hand and right-hand support members 21L, 21R are provided with projections 24L, 24R respectively as shown in FIG. 3. These projections 24L, 24R are maintained in engagement with their corresponding bent portions 25L, 25R in a bifurcated shape and formed at left and right end portions of the pinch roller changeover member 13. In the respective azimuth alignment screw support members 21L, 21R, azimuth alignment screws 26L*a*, 26L*b*; 26R*a*, 26R*b* are received in front and rear pairs.

In contrast, a mounting base 27 made of a synthetic resin is provided on the upper surface of a plate-like member 23. Guide projections 28L, 28R are provided upright on left and right end portions of the upper surface of the mounting base 27. Above the upper surface of the mounting base 27, a downward-arched leaf spring 29 and a magnetic head support strip 30 are successively arranged. The magnetic head 20 is secured centrally on the support strip 30. The leaf spring 29 and support strip 30 define guide holes 32L, 32R; 33L, 33R through left and right end portions thereof. The guide holes 32L, 32R; 33L, 33R are fit on their corresponding guide projections 28L, 28R, whereby the leaf spring 29 and support strip 30 are movable up and down. Further, upwardly-arched portions 34L, 34R are formed at both left and right end portions of the support strip 30 respectively.

Figure 1:
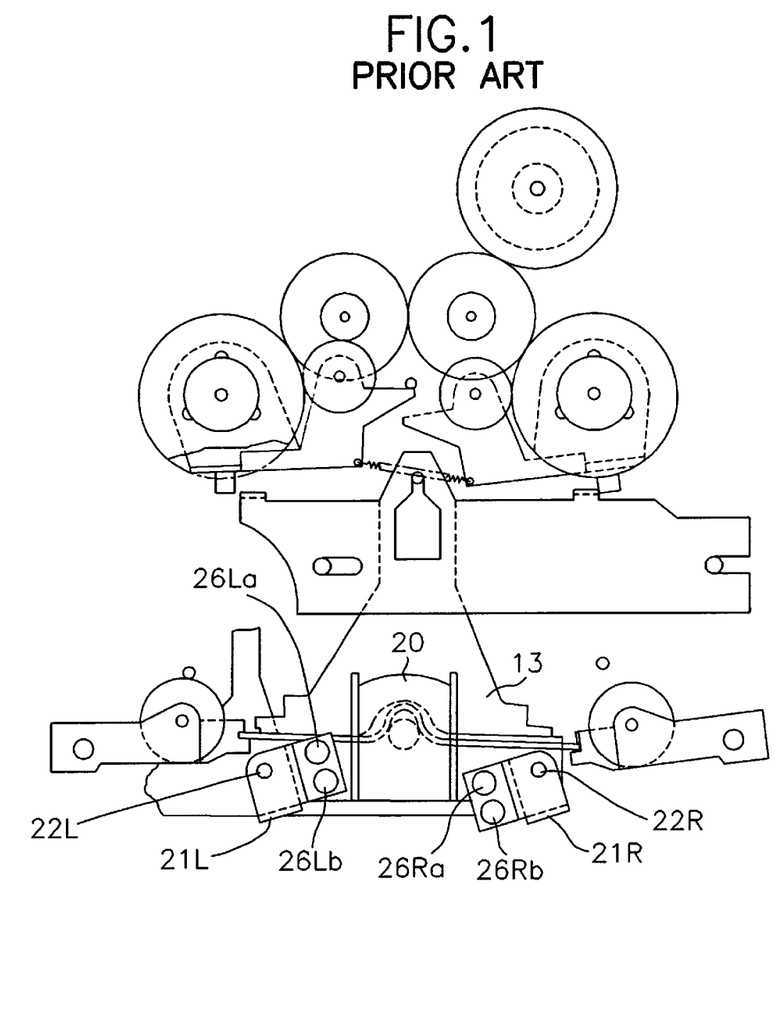
FIG. 1 is a plan view of the conventional azimuth alignment mechanism.

In the state shown in FIG. 1 in which the pinch roller changeover member 13 is turned clockwise, the left hand member 21L turns to the front direction whereas the right-hand member 21R turns rearward. Hence, the rear azimuth alignment screw 26L*b* is in contact at bottom thereof with the arched portion 34L on the left, and the front azimuth alignment screw 26R*a* is in contact at the bottom thereof with the arched portion 34R on the right. The vertical position and inclination of the magnetic head 20 are controlled by these two screws 26L*b*, 26R*a*. When the pinch roller changeover member 13 is turned counter-clockwise due to the failure of azimuth alignment, the left-hand member 21L is turned rearward whereas the right-hand member 21R is turned to the front direction. As a result, the front azimuth alignment screw 26L*a* is in contact at the bottom thereof with the arched portion 34L on the left, and the rear azimuth alignment screw 26R*b* is in contact at the bottom thereof with the arched portion 34R on the right. The vertical position and inclination of the magnetic head 20 are controlled by these two screws 26L*a*, 26R*b*.

Owing to the adoption of the above described structure, the vertical position and inclination of the magnetic head 20 are controlled by the azimuth alignment screws 26L*b*, 26R*a* when a tape is caused to run in the left. When the tape is caused to run in the right, on the other hand, the vertical position and inclination of the magnetic head 20 are controlled by the azimuth alignment screws 26L*a*, 26R*b*.

However, the conventional azimuth alignment apparatus has problems. First, it is hard to adjust the head angle by controlling each pair of alignment screws 26L*a*, 26R*b*; 26L*b*, 26R*a* screwed at the left and right members installed at both sides of the head. Hence, the cross-talk due to interference between the adjacent channels on the tape can occur. Second, it is hard to ensure the stability of operation because the upwardly arched portions 34L, 34R are worn away owing to the frequent contact with the alignment screws 26L*a*, 26R*b*; 26L*b*, 26R*a* for control the head angle respectively. Third, the conventional alignment apparatus has a high manufacturing cost and is complicated because of the complexity of the construction members.

SUMMARY OF THE INVENTION

It is an object of the present invention to provide an azimuth alignment mechanism capable of easily adjusting the head angle.

It is another object of the present invention to provide an azimuth alignment mechanism capable of maintaining the stability of operation by reducing abrasion of the contact surface contacted with the alignment screws.

It is another object of the present invention to provide an azimuth alignment mechanism having simple construction members for changing the head angle according to the changeover of the traveling direction of the tape and for being easily assembled in the car audio.

To achieve the above objects, an azimuth alignment mechanism according to the present invention comprises:

a driving portion having a driving motor driven by a control portion and a mode changeover lever to successively operate according to a rotation of the driving motor for controlling operation modes;

a head movement portion for approaching a head to a tape and retracting the head from the tape according to the operation modes, the head is mounted thereon;

an azimuth alignment portion installed at a side of the head on the head movement portion and having azimuth alignment screws switched according to the operation modes for adjusting the head azimuth; and a mounting portion contacting the azimuth alignment portion with the head and fixing the head at the head movement portion by connecting with an upper portion of the head for adjusting the head azimuth according to the switching operation of the azimuth alignment portion.

The azimuth alignment portion is pivotally installed on the head movement portion. The azimuth alignment portion also has the alignment screws for adjusting the head angle according to the operating mode, a changeover portion and guiding portion for switching the alignment screws, and an urged portion engaged with the mounting portion to hold the azimuth alignment portion. The mounting portion has an elastic pressing portion engaged with the urged portion for holding the azimuth alignment portion. The head movement portion has a contact portion selectively in contact with the alignment screws according to the operation modes for adjusting the head azimuth. A thin plate for preventing abrasion of the contacting portion is installed between the azimuth alignment portion and the contact portion.

In the azimuth alignment mechanism according to the present invention, the adjustment of the head angle is easily accomplished by switching the two screws of the azimuth alignment portion. Abrasion of the contact portion and the screws will be reduced because the thin plate is slid on the contact portion during the pivoting operation of the azimuth alignment portion. Hence, the stability of operation of the azimuth alignment mechanism is ensured. Also, the azimuth alignment mechanism according to the present invention has a simple construction because of the use the azimuth alignment portion interlocking with the head movement portion and the switching portion installed between the head movement portion and the azimuth alignment portion for switching the azimuth alignment portion according to the operation modes. Therefore, the head angle can be easily controlled.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Hereinafter, a dual head azimuth alignment mechanism in an autoreverse car audio device according to the present invention will be described in detail with reference to the FIG. 4 through FIG. 7.

Figure 4:
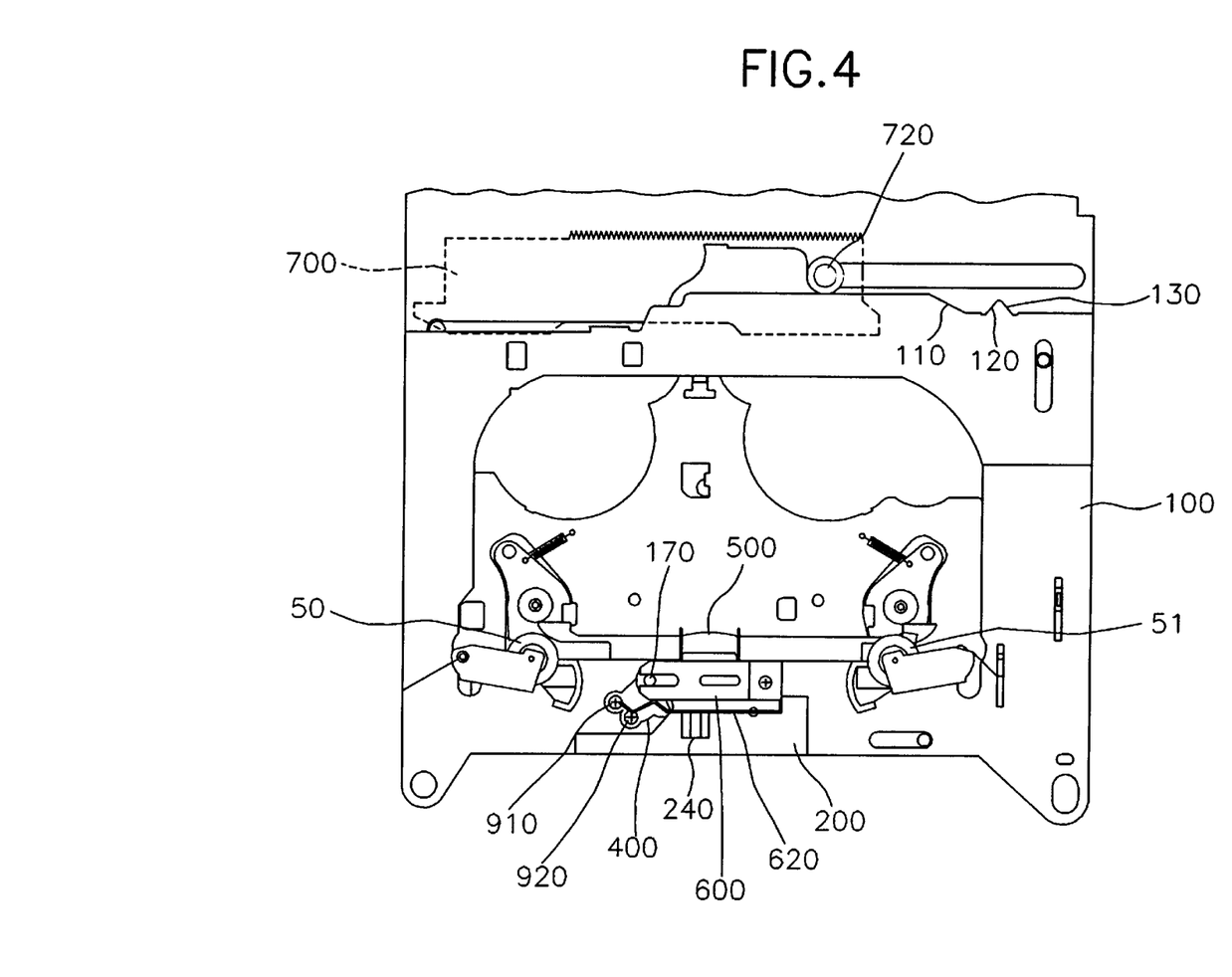
FIG. 4 is a plan view of the azimuth alignment mechanism according to the present invention.
Figure 5:
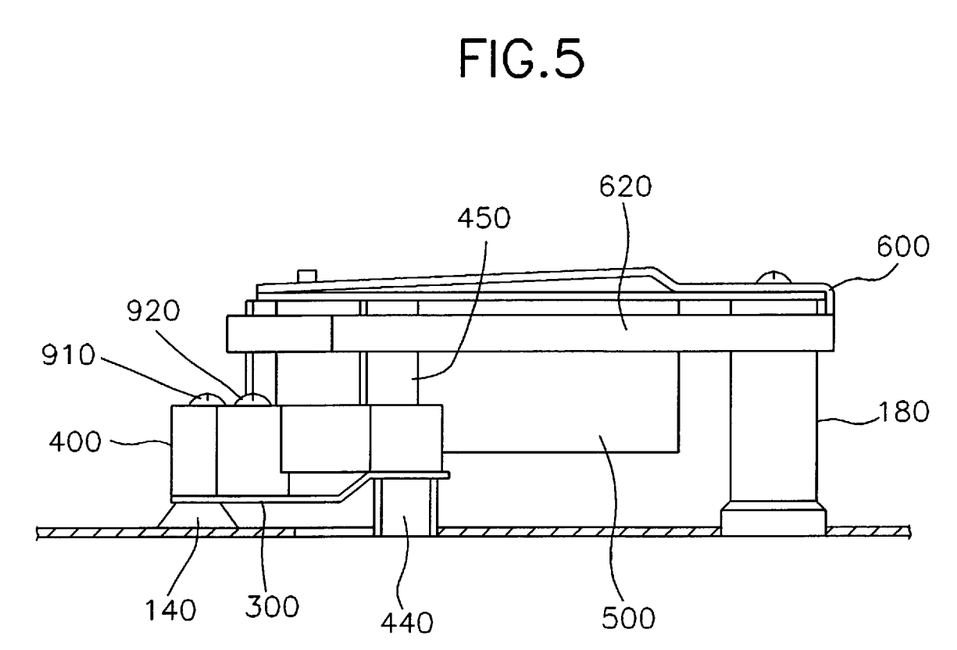
FIG. 5 is a side view of the azimuth alignment mechanism according to the present invention.
Figure 6:
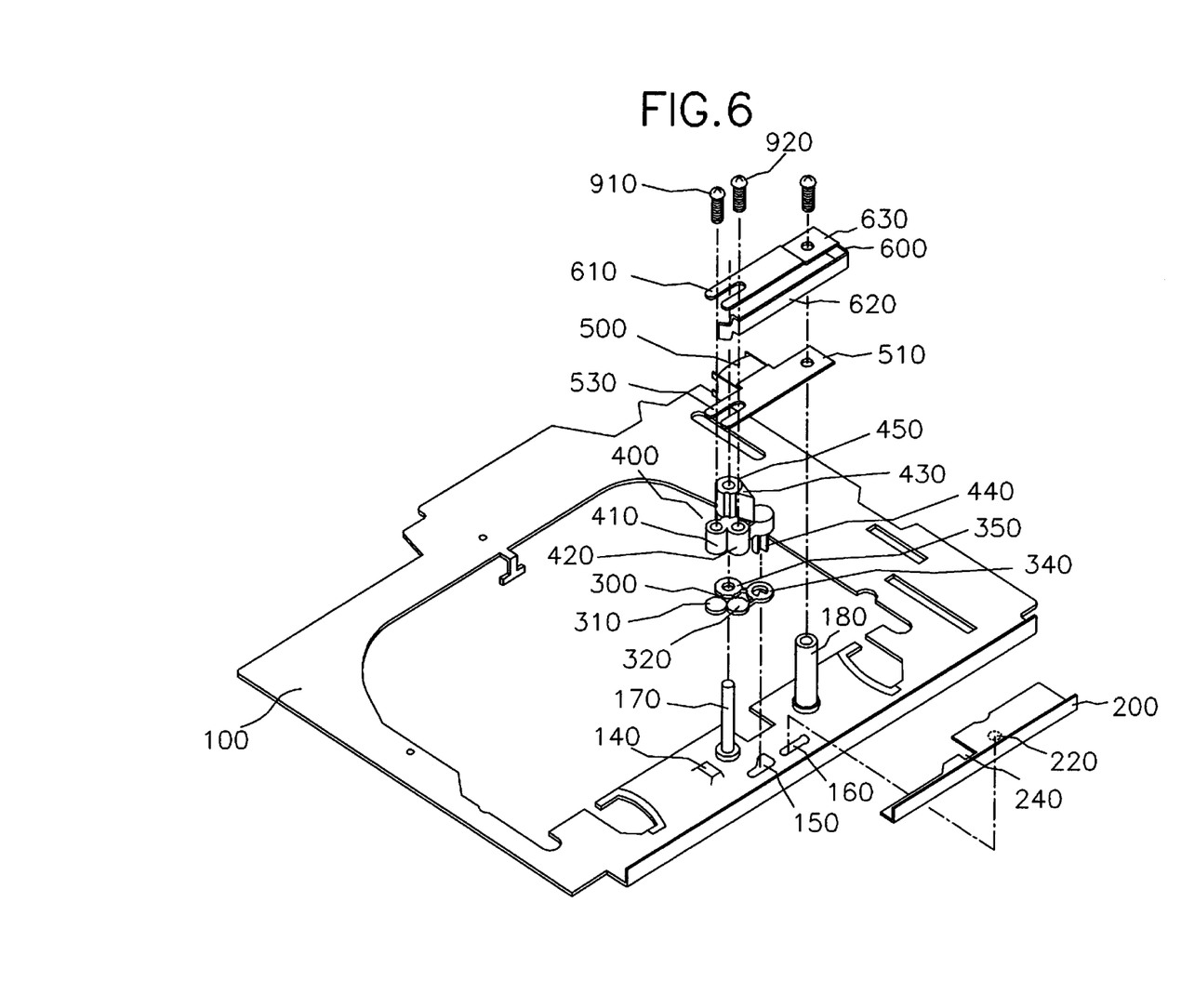
FIG. 6 is an exploded perspective view of the azimuth alignment mechanism according to the present invention.
Figure 7:
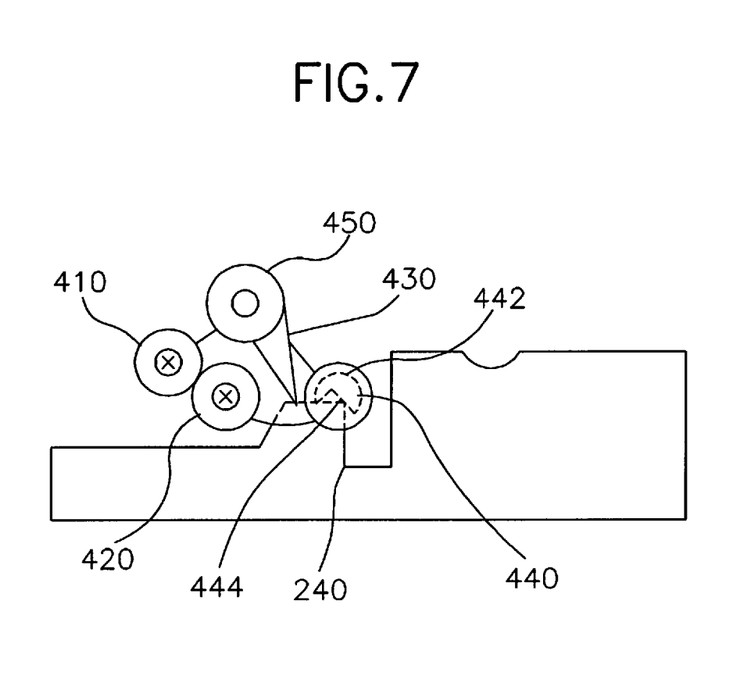
FIG. 7 is a front view which shows the relationship between the slider and the azimuth alignment portion of the azimuth alignment mechanism according to the present invention.

FIG. 4 is a plan view of the azimuth alignment mechanism according to the present invention, FIG. 5 is a side view of the azimuth alignment mechanism according to the present invention, FIG. 6 is an exploded perspective view of the azimuth alignment mechanism according to the present invention, and FIG. 7 is a front view which shows the relationship between the slider and the azimuth alignment portion.

In the drawings, reference number 700 indicates a mode changeover lever, and reference number 100 indicates a head mounted plate in which a head 500 and an azimuth alignment portion 400 are installed thereon. Mode changeover lever 700 is movably installed rearward of head mounted plate 100. Mode changeover lever 700 is controlled to move, for example, from the left to the right or from the right to the left by an unillustrated control system. A cam of head mounted plate 100 engaged with mode changeover lever 700 comprises a first declining portion 110, a second inclining portion 120, and a third declining portion 130. Head mounted plate 100 is controlled to move, for example, up and down by mode changeover lever 700. Head mounted plate 100 comprises a shaft 170 for installing azimuth alignment portion 400 thereon, a fixing shaft 180 for fixing head 500 thereon, and a contact portion 140 formed at a position capable of making contact with the azimuth alignment portion 400. Head mounted plate 100 defines a guidance groove 150 in which azimuth alignment portion 400 moves along the groove 150 according to the mode changeover and a groove 160 engaged with a slider 200 to move slider 200 along with groove 160. Slider 200 comprises a guidance roller 220 fixed at the rear face thereof and a rectangular cut out section 240 engaged with azimuth alignment portion 400. Slider 200 is installed at head mounted plate 100 by engaging guidance roller 220 with groove 160 to move, for example, from the left to the right or from the right to the left according to the mode changeover. In this embodiment, contact portion 140 is upwardly-arched at head mounted plate 100.

Azimuth alignment portion 400 comprises a first alignment screw installing portion 410 for screwing a first alignment screw 910 thereon and a second alignment screw installing portion 420 for screwing a second alignment screw 920 thereon, to adjust the-azimuth of head 500, an urged portion 430, a guidance portion 440 for switching first alignment screw 910 and second alignment screw 920 by moving along rectangular cut out section 240 and guidance groove 150, and a body fixing portion 450 for pivotally fixing azimuth alignment portion 400 at head mounted plate 100. Urged portion 430 is pressed by mounting portion 600 according to the interlocking of head mounted plate 100 and slider 200 during the mode changeover operation for pivoting azimuth alignment portion 400. Screws 910, 920 pierce through and engage with first and second alignment screw installing portions 410, 420. A thin plate 300 comprises a first screw contact portion 310 and a second screw contact portion 320 for contacting with each of screws 910, 920, a connecting portion 340 for connecting with azimuth alignment portion 400, and a thin plate fixing portion 350. Thin plate 300 is pivotally installed at head mounted plate 100 by inserting shaft 170 into thin plate fixing portion 350. Azimuth alignment portion 400 is installed at head mounted plate 100 by inserting shaft 170 on head mounted plate 100 into body fixing portion 450 and by piercing guidance portion 440 through connecting portion 340 and then engaging guidance portion 440 with guidance groove 150.

A head 500 comprises a shaft connecting portion 530 formed in a bifurcated shape, and a head fixing portion 510 defining a head fixing hole. A mounting portion 600 comprises a fixing portion 630 for fixing head 500 at head mounted portion 100 by screwing fixing portion 630 to fixing shaft 180, a fork portion 610 for fixing azimuth alignment portion 400 at head mounted plate 100 integrally enlarged from one side of fixing portion 630 and formed in bifurcated shape for connecting with shaft 170, and an elastic portion 620 integrally enlarged from the other side of fixing portion 630 for selectively being connected with urged portion 430 according to the operation modes. For a fixing head 500 at head mounted plate 100, shaft 170 is inserted into shaft connecting portion 530, and fixing hole of head fixing portion 510 fits into fixing shaft 180. Shaft 170 is inserted to fork portion 610, and then fixing portion 630 and head fixing portion 510 are screwed to head fixing shaft 180.

The operations and effects of azimuth aligning mechanism are described below.

Mode changeover lever 700 is supposed to move, for example, toward the cam of head mounted plate 100 in FIG. 4 according to the operation mode. When a roller 720 fixed at mode changeover lever 700 moves along first declining portion 110, head mounted plate 100 installed with head 500 moves upward and then approaches the traveling surface of the tape(not shown). At the same time, pinch roller 50 approaches the corresponding capstan by the unshown pinch roller switching mechanism. On the other side, guidance portion 440 formed at azimuth alignment portion 400 moves along guidance groove 150 defined at head mounted plate 100 toward shaft 170. As a result, the tape travels in a forward direction.

When the unshown control portion detects an end point of the traveling tape, the control portion instructs mode changeover lever 700 to move toward the cam of head mounted plate 100 fixing shaft 180 to change the traveling direction. Roller 720 of mode changeover lever 700 moves along second inclining portion 120 of head mounted plate 100 toward the right. Head mounted plate 100 moves downward until roller 720 reaches the top of second inclining portion 120. Pinch roller 50 departs from the corresponding capstan. Roller 720 continuously moves along third declining portion 130 to the right. Head mounted plate 100 moves toward the traveling surface of the tape. At that time, a guidance roller 220 of slider 200 engaged with hole 160 defined at head mounted plate 100 moves from fixing shaft 180 toward shaft 170 in FIG. 4. Guidance portion 440 of azimuth aligning portion 400 engages with rectangular cut out section 240 of slider 200 and moves downward according to the movement of slider 200. Rectangular cut out section 240 is formed in an U shape, and guidance portion 440 comprises a softly sloped outer side 442 and a right-angled inner side 444. Hence, when guidance portion 440 moves along rectangular cut out section 240, azimuth alignment portion 400 installed at head mounted plate 100 is turned clockwise centered as shaft 170. Therefore, when roller 720 finishes traveling along with third declined portion 130, first aligning screw 910 departs from contact portion 140 upwardly-arched from head mounted plate 100, and second aligning screw 920 contacts with contact portion 140. At the same time, pinch roller 51 approaches the corresponding capstan. As a result, the traveling direction of the tape is changed.

In the azimuth alignment mechanism according to the present invention, the azimuth alignment portion has two alignment screws for adjusting the head azimuth, and thus the adjustment of the head azimuth is easily accomplished by controlling the two screws. Abrasion of the contact portion and the screws is reduced because the thin plate is slid on the contact portion during the pivoting operation of the azimuth alignment portion. Also, the elastic pressing portion assists to pivot the azimuth alignment portion during the switching operation and holds the azimuth alignment portion after the switching operation is finished.

Although the present invention has been described in detail, it is not to be taken by way of limitation wherein the spirit and scope of the present invention is limited only by the terms of the appended claims.

What is claimed is:

1. A dual head azimuth alignment mechanism of an autoreverse car audio device comprising:

a driving portion having a mode changeover lever for being moved in a lateral direction according to operation modes;

a head movement portion having a cam formed integrally therewith and directly connected to the mode changeover lever, a fixing shaft for securing a head thereon, and a shaft formed apart from the fixing shaft in lateral direction, and for moving the head to a tape and retracting the head from the tape according to the movement of the mode changeover lever, wherein the head has a head fixing portion and a shaft connecting portion and is fixed on the head movement portion by the connection between the head fixing portion and the fixing shaft;

an azimuth alignment portion pivotally installed at a side of the head on the head movement portion by receiving the shaft and having azimuth alignment screws switched by the pivotal movement of the azimuth alignment portion for adjusting the head azimuth; and a mounting portion making contact with a top of the azimuth alignment portion by receiving the shaft and making contact with a top of the head by receiving the fixing shaft, the shaft passing through the azimuth alignment portion and the shaft connecting portion, the fixing shaft passing through the head fixing portion and for adjusting the head azimuth according to the switching operation of the azimuth alignment portion.

2. The dual head azimuth alignment mechanism of an autoreverse car audio device as claimed in claim 1, wherein said head movement portion comprises:

a contact portion integrally formed at a position corresponding with said azimuth alignment screws on the head movement portion and for adjusting a head angle; and an upper side having a guiding groove in which said azimuth alignment portion moves along said groove according to the changeover of operating mode.

3. The dual head azimuth alignment mechanism of an autoreverse car audio device as claimed in claim 2, wherein said contact portion is upwardly-arched.

4. The dual head azimuth alignment mechanism of an autoreverse car audio device as claimed in claim 2, wherein said cam comprises:

a first declining portion for moving said head to a traveling face of the tape;

a second inclining portion integrally formed with the first declining portion and for removing said head from the traveling face of the tape when the tape travel is finished in one direction; and a third declining portion integrally formed with the second inclining portion and for moving said head to the traveling face of the tape to move the tape in another direction according to the switching of said azimuth alignment portion.

5. The dual head azimuth alignment mechanism of an autoreverse car audio device as claimed in claim 4, wherein said azimuth alignment portion further comprises a changeover portion installed between said head movement: portion and said azimuth alignment portion and for pivoting said azimuth alignment portion to switch the aligning screws according to the operation mode.

6. The dual head azimuth alignment mechanism of an autoreverse car audio device as claimed in claim 5, wherein said changeover portion comprises:

a guidance roller fixed at the rear face thereof and engaged with said groove; and a rectangular cut out section formed for engagement with one side of said azimuth alignment portion to pivot said azimuth alignment portion according to the sliding of said changeover portion.

7. The dual head azimuth alignment mechanism of an autoreverse car audio device as claimed in claim 6, wherein said azimuth alignment portion comprises a body fixing portion for pivotally being fixed at said head movement portion;

a first alignment screw installing portion having a hole for screwing a first alignment screw to adjust said head azimuth;

a second alignment screw installing portion having a hole for screwing a second alignment screw so as to adjust said head azimuth;

an urged portion pressed by said mounting portion according to the gearing of said head movement portion and said changeover portion during the mode changeover operation for pivoting said azimuth alignment portion; and a guidance portion for pivoting said azimuth alignment portion to switch said first alignment screw and said second alignment screw, said guidance portion moves along said rectangular cut out section and said guidance groove.

8. The dual head azimuth alignment mechanism of an autoreverse car audio device as claimed in claim 7, wherein said guidance portion comprises an outer side forming a soft slope, and a right-angled inner side for moving along said rectangular cut out section to pivot said azimuth alignment portion.

9. The dual head azimuth alignment mechanism of an autoreverse car audio device as claimed in claim 8, wherein said azimuth alignment portion further comprises a thin plate installed between the bottom faces of said alignment screws and said contact portion for preventing abrasion of said contact portion.

10. The dual head azimuth alignment mechanism of an autoreverse car audio device as claimed in claim 9, wherein said mounting portion comprises a fixing portion having a hole for connecting with said fixing shaft of said head mounting portion by screwing a screw thereon;

a fork portion formed in bifurcated shape for connecting with said shaft to fix said azimuth alignment portion at said head movement portion and integrally enlarged from one side of said fixing portion; and an elastic portion integrally enlarged from the other side of said fixing portion for giving an elastic force to said urged portion when said azimuth alignment portion is pivoted.

11. The dual head azimuth alignment mechanism of an autoreverse car audio device as claimed in claim 10, wherein said elastic portion comprises a bent portion for changing a contacting position of said urged portion according to the pivoting of said azimuth alignment portion.

12. A dual head azimuth alignment mechanism of an autoreverse car audio device comprising:

a driving portion having a mode changeover lever for being moved in lateral direction according to operation modes;

a head movement portion having a cam formed integrally therewith and directly connected to the mode changeover lever, a fixing shaft for securing a head thereon, and a shaft formed apart from the fixing shaft in lateral direction, and for moving the head to a tape and retracting the head from the tape according to the operation modes, wherein the head is mounted thereon;

an azimuth alignment portion installed at a side of the head on the head movement portion and having azimuth alignment screws switched according to the operation of modes for adjusting the head azimuth; and a mounting portion making contact with a top of the azimuth alignment portion by receiving the shaft and making contact with a top of the head by receiving the fixing shaft, the shaft passing through the azimuth alignment portion and the shaft connecting portion, the fixing shaft passing through the head fixing portion and for adjusting the head azimuth according to the switching operation of the azimuth alignment portion;

wherein said head movement portion comprises:

a contact portion integrally formed at a position corresponding with said azimuth alignment screws on the head movement portion and for adjusting a head angle; and an upper side having a guiding groove in which said azimuth alignment portion moves along said groove according to the changeover of operating mode;

wherein said head movement portion comprises a cam having a first declining portion for moving said head to a traveling face of the tape, a second inclining portion integrally formed with the first declining portion and for removing said head from the traveling face of the tape when the tape travel is finished in one direction, and a third declining portion integrally formed with the second inclining portion and for moving said head to the traveling face of the tape to move the tape in another direction according to the switching of said azimuth alignment portion, and for controlling the head position according to the changeover of the operating mode by successively operating with said mode changeover lever;

wherein said azimuth alignment portion further comprises a changeover portion installed between said head movement portion and said azimuth alignment portion and for pivoting said azimuth alignment portion to switch the aligning screws according to the operation mode;

wherein said changeover portion comprises:

a guidance roller fixed at the rear face thereof and engaged with said groove; and a rectangular cut out section formed for engagement with one side of said azimuth alignment portion to pivot said azimuth alignment portion according to the sliding of said changeover portion.

13. The dual head azimuth alignment mechanism of an autoreverse car audio device as claimed in claim 12, wherein said azimuth alignment portion comprises:

a body fixing portion for pivotally being fixed at said head movement portion;

a first alignment screw installing portion having a hole for screwing a first alignment screw to adjust said head azimuth;

a second alignment screw installing portion having a hole for screwing a second alignment screw so as to adjust said head azimuth;

an urged portion pressed by said mounting portion according to the gearing of said head movement portion and said changeover portion during the mode changeover operation for pivoting said azimuth alignment portion; and a guidance portion for pivoting said azimuth alignment portion to switch said first alignment screw and said second alignments crew, said guidance portion moves along said rectangular cut out, section and said guidance groove.

14. The dual head azimuth alignment mechanism of an autoreverse car audio device as claimed in claim 13, wherein said guidance portion comprises an outer side forming a soft slope, and a right-angled inner side for moving along said rectangular cut out section to pivot said azimuth alignment portion.

15. The dual head azimuth alignment mechanism of an autoreverse car audio device as claimed in claim 14, wherein said azimuth alignment portion further comprises a thin plate installed between the bottom faces of said alignment screws and said contact portion for preventing abrasion of said contact portion.

16. The dual head azimuth alignment mechanism of an autoreverse car audio device as claimed in claim 15, wherein said mounting portion comprises:

a fixing portion having a hole for connecting with said fixing shaft of said head mounting portion by screwing a screw thereon;

a fork portion formed in bifurcated shape for connecting with said shaft to fix said azimuth alignment portion at said head movement portion and integrally enlarged from one side of said fixing portion; and an elastic portion integrally enlarged from the other side of said fixing portion for giving an elastic force to said urged portion when said azimuth alignment portion is pivoted.

17. The dual head azimuth alignment mechanism of an autoreverse car audio device as claimed in claim 16, wherein said elastic portion comprises a bent portion for changing a contacting position of said urged portion according to the pivoting of said azimuth alignment portion.

* * * * *